US007936832B2

(12) United States Patent
Ma et al.

(10) Patent No.: US 7,936,832 B2
(45) Date of Patent: May 3, 2011

(54) RECEIVER APPARATUS OF THE ADAPTIVE ICI CANCELLATION ITERATIVE RECEIVER IN WIRELESS COMMUNICATION SYSTEM AND ICI CANCELLATION METHOD

(75) Inventors: Zhang-Yong Ma, Daejeon (KR); Young-Il Kim, Daejeon (KR)

(73) Assignees: Samsung Electronics Co., Ltd (KR); Electronics and Telecommunications Research Institute (KR); KT Corporation (KR); SK Telecom Co., Ltd (KR); Hanaro Telecom, Inc. (KR)

( * ) Notice: Subject to any disclaimer, the term of this patent is extended or adjusted under 35 U.S.C. 154(b) by 1080 days.

(21) Appl. No.: 11/636,872

(22) Filed: Dec. 11, 2006

(65) Prior Publication Data

US 2007/0153927 A1 Jul. 5, 2007

(30) Foreign Application Priority Data

Dec. 9, 2005 (KR) ........................ 10-2005-0120844

(51) Int. Cl.
*H04K 1/10* (2006.01)
*H04L 27/28* (2006.01)

(52) U.S. Cl. ........................................................ 375/260

(58) Field of Classification Search .................. 375/148, 375/229, 232, 260, 341, 346, 350, 140, 267, 375/316, 340, 343, 347; 370/203, 260, 281, 370/329, 330, 341, 343

See application file for complete search history.

(56) References Cited

U.S. PATENT DOCUMENTS

| 5,539,773 | A | * | 7/1996 | Knee et al. | .................... | 375/232 |
| 7,133,886 | B2 | | 11/2006 | Jin et al. | | |
| 7,443,782 | B2 | * | 10/2008 | Yang et al. | .................... | 370/203 |
| 7,450,652 | B2 | * | 11/2008 | Park et al. | ....................... | 375/260 |
| 2004/0005010 | A1 | * | 1/2004 | He et al. | ....................... | 375/260 |
| 2005/0152468 | A1 | * | 7/2005 | Lozhkin | ........................ | 375/260 |
| 2005/0249319 | A1 | * | 11/2005 | Suh et al. | ...................... | 375/347 |
| 2006/0029166 | A1 | * | 2/2006 | Kang | ............................. | 375/341 |
| 2006/0072862 | A1 | * | 4/2006 | Scotte et al. | .................... | 384/44 |
| 2006/0078040 | A1 | * | 4/2006 | Sung et al. | .................... | 375/140 |

FOREIGN PATENT DOCUMENTS

KR      1020040052008      6/2004

OTHER PUBLICATIONS

A Variable-Step LMS Based on Tap Weight Time Variation, by M.A. Arnao and S.S.Rao.*

* cited by examiner

*Primary Examiner* — David C Payne
*Assistant Examiner* — Syed Haider
(74) *Attorney, Agent, or Firm* — The Farrell Law Firm, P.C.

(57) ABSTRACT

An ICI cancellation iterative receiver and an ICI cancellation method in the wireless communication system is provided. In order to eliminate the Inter-carrier-interference (ICI) due to phase noise, an adaptive ICI cancellation scheme based on the wireless communication system is presented. In order to correct the contaminated preamble symbols due to phase noise, a first LMS adaptive filter in the receiver cancels the ICI. In the following data symbols of a frame, joint of the turbo decoder and channel estimation is provided. The complexity of the joint algorithm is analyzed and the algorithm can be implemented in the wireless communication system. The simulation results show that the performance can be improved dramatically.

9 Claims, 7 Drawing Sheets

RECEIVER APPARATUS OF THE ADAPTIVE ICI CANCELLATION ITERATIVE RECEIVER IN WIRELESS COMMUNICATION SYSTEM AND ICI CANCELLATION METHOD

PRIORITY

BACKGROUND OF THE INVENTION

1. Field of the Invention

The present invention relates to inter-carrier-interference (ICI) cancellation, and in particular, it relates to an ICI cancellation iterative receiver and an ICI cancellation method in the OFDMA (Orthogonal Frequency Division Multiple Access) wireless communication system.

2. Description of the Related Art

The key drivers of demand for radio-based broadband access networks are massive growth in wireless and mobile communications, the emergence of multimedia applications, demand for high-speed Internet access, and the deregulation of the telecommunications industry. Due to their advantages, (e.g. in efficiently eliminating channel multi-path), OFDM (Orthogonal Frequency Division Multiplexing) is considered as one of the most attractive transmission techniques for future wireless multimedia communications in frequency selective channels. It has been adopted for the European Digital Audio Broadcasting (DAB) and Digital Video Terrestrial Broadcasting (DVB) standards, and it has just been standardized for new wireless LAN generations (such as IEEE 802.16a, and HIPERLAN). However, in real life situations, multicarrier transmission is subject to phase noise and the difference between the phase of the carrier and the phase of the local oscillator, a portion of which is untracked, and hence, an accurate prediction of the tolerable phase noise allows system or RF designers to relax specifications.

The OFDM system (e.g., the wireless broadband (WiBro) system based on the OFDMA wireless communication system or the high-speed portable (HP) Internet system) is sensitive to the time variant distortions in OFDM like oscillator phase noise, carrier and sampling frequency offset, and Doppler spread. Compared with the ICI introduced by the carrier frequency offset, Doppler-induced ICI appears to be more challenging. Meanwhile, phase noise, interpreted as a parasitic phase modulation in the oscillator's signal, is the difference between the phase of the carrier and the phase of the local oscillator, a portion of which is untracked, and BER (Bit Error Rate) performance is degraded due to the ICI induced by phase noise. Previous studies have qualified the effects of ICI on the system performance, which fails to totally eliminate ICI from the received signals.

SUMMARY OF THE INVENTION

The present invention has been made in an effort to provide an ICI cancellation iterative receiver and an ICI cancellation method in the OFDMA wireless communication system.

In one aspect of the present invention, a method for canceling ICI from an OFDM signal received from a receiver in a wireless communication system includes canceling ICI included in a preamble symbol of the received signal; channel equalizing a data symbol of the received signal by using an initial channel parameter estimated by using the ICI-canceled preamble symbol; finding a soft decision value of a turbo code for the channel-equalized data symbol; and canceling the ICI from the data symbol by using the soft decision value.

In another aspect of the present invention, a receiver device for canceling ICI from an OFDM signal received from a receiver in a wireless communication system includes a first least mean square (LMS) adaptive filter for canceling ICI included in a preamble symbol of a received signal by using the LMS adaptive method; a channel estimator for estimating an initial channel parameter by using the ICI canceled preamble symbol; a channel equalizer for channel equalizing a data symbol of the received signal by using the initial channel parameter estimated by the channel estimator; a turbo map decoder for generating a soft decision value of the turbo code for the channel equalized data symbol; and a second LMS adaptive filter for canceling ICI from the data symbol through the LMS adaptive method by using the soft decision value generated by the turbo map decoder.

BRIEF DESCRIPTION OF THE DRAWINGS

The above and other objects, feature and advantages of the present invention will become more apparent t from the following detailed description, taken in conjunction with the accompanying drawings, in which.

DETAILED DESCRIPTION OF THE EMBODIMENTS

With reference to accompanying drawings, embodiments of the present invention will now be described so that a person skilled in the art may easily realize them. As those skilled in the art would realize, the described embodiments may be modified in various different ways, all without departing from the spirit or scope of the present invention. To clarify the embodiment of the present invention, parts that are not related to the present invention are omitted, and same parts over the specification have the same reference numerals.

A method for canceling an ICI in the wireless communication system according to an embodiment of the present invention will now be described.

A transmitted signal $X_k$ is generated at the baseband by taking inverse Fast Fourier transform (IFFT), which is used to modulate N subcarriers. A cyclic prefix (CP) is added before the transmission of the OFDM symbol in order to preserve orthogonality in the system and simplify channel equalization. The output of the IFFT is expressed in Equation (1).

$$s(m) = \sum_{k=0}^{N-1} X_k e^{j\frac{2\pi km}{N}} \text{ for } m = 0, 1, \ldots, N-1 \tag{1}$$

where $j^2=-1$, and N is the total number of subcarriers. For ease of description, the cyclic prefix will not be considered since it is eliminated in the receiver. However, it is assumed that there is no overlap between different OFDM symbols.

For a High-speed Portable internet (Hpi) system, the length of the cyclic prefix is longer than the maximum delay of the multipath channel, and the ICI due to the Doppler-shift is accordingly omitted. The ICI in the embodiment is caused by the phase noise. The signal is only affected by the phase noise $\theta(n)$ at the receiver, as given in Equation (2).

$$r(n) = \sum_{l=0}^{L-1} h(l)s(n-l) \cdot e^{j\theta(n)} \quad (2)$$

where h(l) is the channel parameter of the multipath, and L is the maximum samples delayed by the multipath channel. As known, the length of cyclic prefix is longer than L, and the ISI due to the Doppler shift is removed.

After performance of Discrete Fourier Transform (DFT), Equation (3) is given as follows.

$$Y(k) = \frac{1}{N}\sum_{m=0}^{N-1} r(m) \cdot e^{-j\frac{2\pi}{N}km} \quad (3)$$

$$= \frac{1}{N}\sum_{m=0}^{N-1} e^{j\theta(m)} \sum_{r=0}^{N-1}\sum_{l=0}^{L-1} h(l)X(m-l) \cdot e^{j\frac{2\pi}{N}rm} e^{-j\frac{2\pi}{N}km}$$

$$= \frac{1}{N}\sum_{m=0}^{N-1} e^{j\theta(m)} \sum_{r=0}^{N-1}\sum_{l=0}^{L-1} h(l)X(m-l) \cdot e^{j\frac{2\pi}{N}(r-k)m}$$

$$= \frac{1}{N}\sum_{m=0}^{N-1}\sum_{l=0}^{L-1} h(l)X(m-l) \sum_{r=0}^{N-1} e^{j\theta(m)} \cdot e^{j\frac{2\pi}{N}(r-k)m}$$

In order to separate the signal and noise terms, it will be given that $\theta(m)$ is small (compared to an initial phase at the beginning of an OFDM symbol) justifying the approximation $e^{j\theta(m)} \approx 1 + \theta(m)$.

In this instance, Equation (3) can be expressed as Equation (4).

$$Y(k) \approx \frac{1}{N}\sum_{r=0}^{N-1}\sum_{l=0}^{L-1} h(l)s(m-l)\sum_{m=0}^{N-1} e^{j\frac{2\pi}{N}(r-k)m} + \quad (4)$$

$$\frac{j}{N}\sum_{r=0}^{N-1} s_r \sum_{m=0}^{N-1} \phi(m) \cdot e^{j\frac{2\pi}{N}(r-k)m}$$

$$= X(k)H(k) + \frac{j}{N}\sum_{r=0}^{N-1} X(r)\sum_{m=0}^{N-1} \phi(m) \cdot e^{j\frac{2\pi}{N}(r-k)m}$$

$$= X(k)H(k) + e(k)$$

Thus, an error term $e_k$ for each sub-carrier which results from some combination of all carriers and is added to the useful signal is generated.

If $r \neq k$, Equation (5) is given.

$$\frac{j}{N}\sum_{r=0}^{N-1} X(k)\sum_{m=0}^{N-1} \theta(m) \cdot e^{j\frac{2\pi}{N}(r-k)m} \quad (5)$$

The result is also a complex number which is added to each sub-carrier's useful signal and has white noise. It is normally known as inter carrier interference (ICI) or loss of orthogonality.

For the WiBro system, each frame starts with a downlink that is Base Station (BS) to Subscriber Station (SS) transmission. The downlink transmission begins with two preambles. Both in downlink and uplink, there are two kinds of subchannels, a diversity channel and a AMC channel. For each data symbol, the pilot subcarriers are inserted to track the phase. The preamble channel and the pilot subcarriers in data symbols can be used to estimate the initial channel parameters.

The processing procedure will now be described.

Considering the implementation of Hpi system, the LMS (least mean square) can be applied to the adaptive filter. During the filtering process, the desired response $\hat{d}(k)$ is the known preamble symbol, where k is the subcarrier location. Given the input, the filter produces an output $\hat{y}(n,k)$ used as an ICI-free preamble symbol for the desired response $\hat{d}(k)_{ins}$. Meanwhile, e(k) is the difference between the desired response and the actual filter output, and e(n,k) and $\hat{u}(n,k)$ are applied to the control mechanism.

The first LMS filter output is expressed in Equation (6).

$$y(k) = \hat{W}^H(k)\hat{u}(k) \quad (6)$$

where $\hat{W}(k) = [\omega_0(k), \omega_1(k), \ldots, \omega_{K-1}(k)]^T$, $\hat{u}(k) = [\hat{u}(k), \hat{u}(k-1), \ldots, u(k-K+1)]^T$.

The estimation error signal is given in Equation 7.

$$e(k) = \hat{d}(k)_{ins} - y(k) \quad (7)$$

The tap-weight is adapted as given in Equation (8).

$$\hat{W}(k+1) = \hat{W}(k) + \mu\hat{u}(k)e^*(k) \quad (8)$$

where $\mu$ is the step-size parameter, and the initial value of $\hat{W}$ is $[1, 0, \ldots, 0]^T$.

Therefore, the initial channel parameters can be attainted by the ICI-free preamble symbols, as set forth in Equation (9).

$$\hat{H}(k)_{ini} = Y(k)X(k) + e(k)d(k) \quad (9)$$

For the following data subcarrier in the frame, the channel effect can be removed by Equation (10).

$$\hat{u}(n,k) = \frac{Y(n,k)\widehat{H}(k)_{ini}^*}{\left|\widehat{H}(k)_{ini}^*\right|^2} + e'(k) \quad (10)$$

In order to improve the accuracy of the channel estimation, the adaptive receiver based on the Turbo decoder can be adopted. The convolutional turbo code is designed to enable support of a Hybrid Automatic Repeat reQuest ARQ (HARQ) scheme. It uses a double binary circular recursive systematic convolutional code. Compared to the conventional turbo codes, the advantages of the non-binary turbo code are: 1) better convergence; 2) larger minimum distance; 3) less sensitive to puncturing patters; 4) reduced latency; and 5) robustness of the decoder. For each decoder based on a MAX-LOG-MAP algorithm, the output information for each iteration is given in Equation (11).

$$\Lambda_i = \frac{4\sqrt{E_b}}{N_0}\sum_{i=0}^{n-1} y_i b_i + \ln\left(\frac{P_{i,k}}{P_{0,k}}\right) + L^e \quad (11)$$

where $y_i$ is the received signal, $b_i$'s are the binary digits of the kth input symbols, and $$\ln\left(\frac{P_{i,k}}{P_{0,k}}\right)$$

is the Multidimensional Log-likelihood Ratio (MLLR) from the observation of the received version of the turbo encoder output. In particular, $L^e$ is the component decoder output and it will be fed as an input to the next decoder.

As known, for the data symbols, the pilot subcarrier is inserted to track the phase variability. The soft-information data decision by the turbo code and the pilot subcarrier can be used as the expected signal for the LMS adaptive filter. After the nth iteration, according to the output $\Lambda_i$ (i=1, 2, 3) of the second decoder, the probability $\{P_0, P_1, P_2, P_3\}$ of the decoded data can be estimated from $\Lambda_i$. Hence, the decided data subcarrier can be given as Equation (12).

$$\hat{d}_{n,k} = P_0*0 + P_1*1 + P_2*2 + P_3*3 \quad (12)$$

The known pilot is an expected signal for the location of the pilot subcarrier. The number of iteration times is determined by the simulation.

Figure 5:
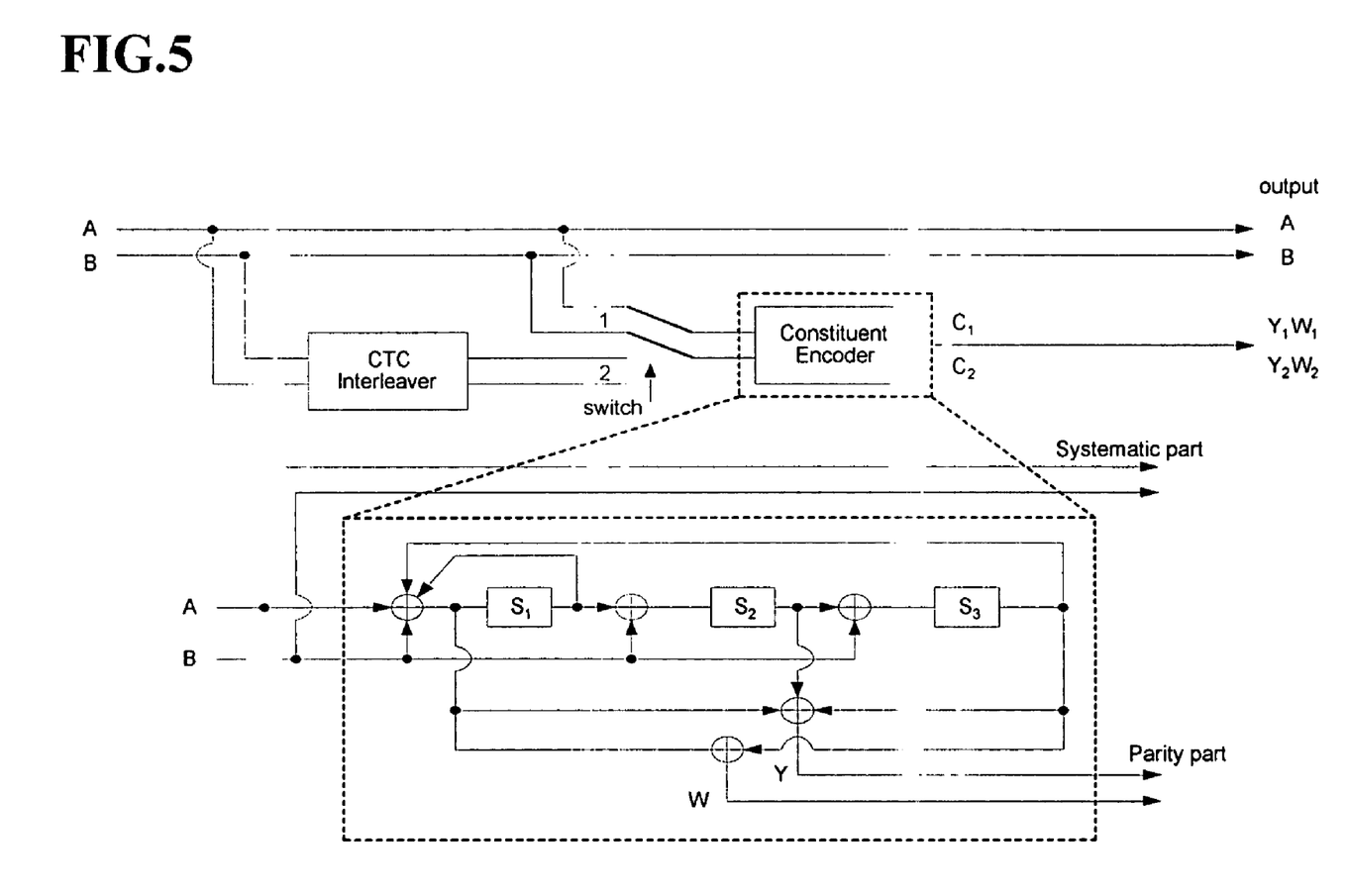
FIG. 5 is a non-binary turbo-code according to the present invention.

The remaining data symbol in a frame can be attained by the second LMS adaptive filter to remove the ICI due to phase noise and Doppler-shift effect, which is presented as FIG. 5. The initial value of $\hat{W}$ should be gained from the first LMS adaptive filter.

With reference to drawings, an ICI cancellation iterative receiver and an ICI cancellation method in the wireless communication system will now be described.

Figure 1:
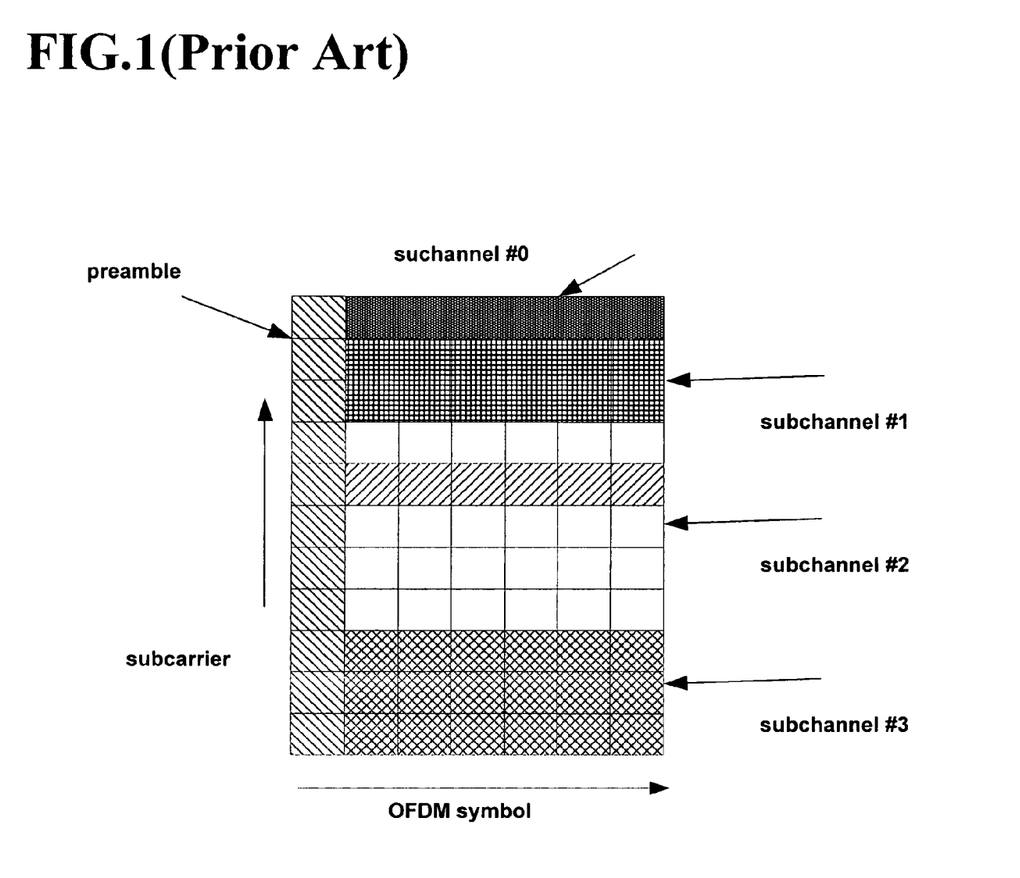
FIG. 1 is an example of a general OFDM frame with pilot symbols and subchannels. [PLEASE LABEL "PRIOR ART".]

FIG. 1 is an example of a general OFDM frame with pilot symbols and subchannels. As shown in FIG. 1, the first symbol is the preamble symbol in each frame. The following symbols are data symbols which transmit user information. In order to track the phase variation, the pilot subcarriers are inserted in the data symbols. The data symbols are divided into subchannels so as to be processed in the MAC layer.

Figure 2:
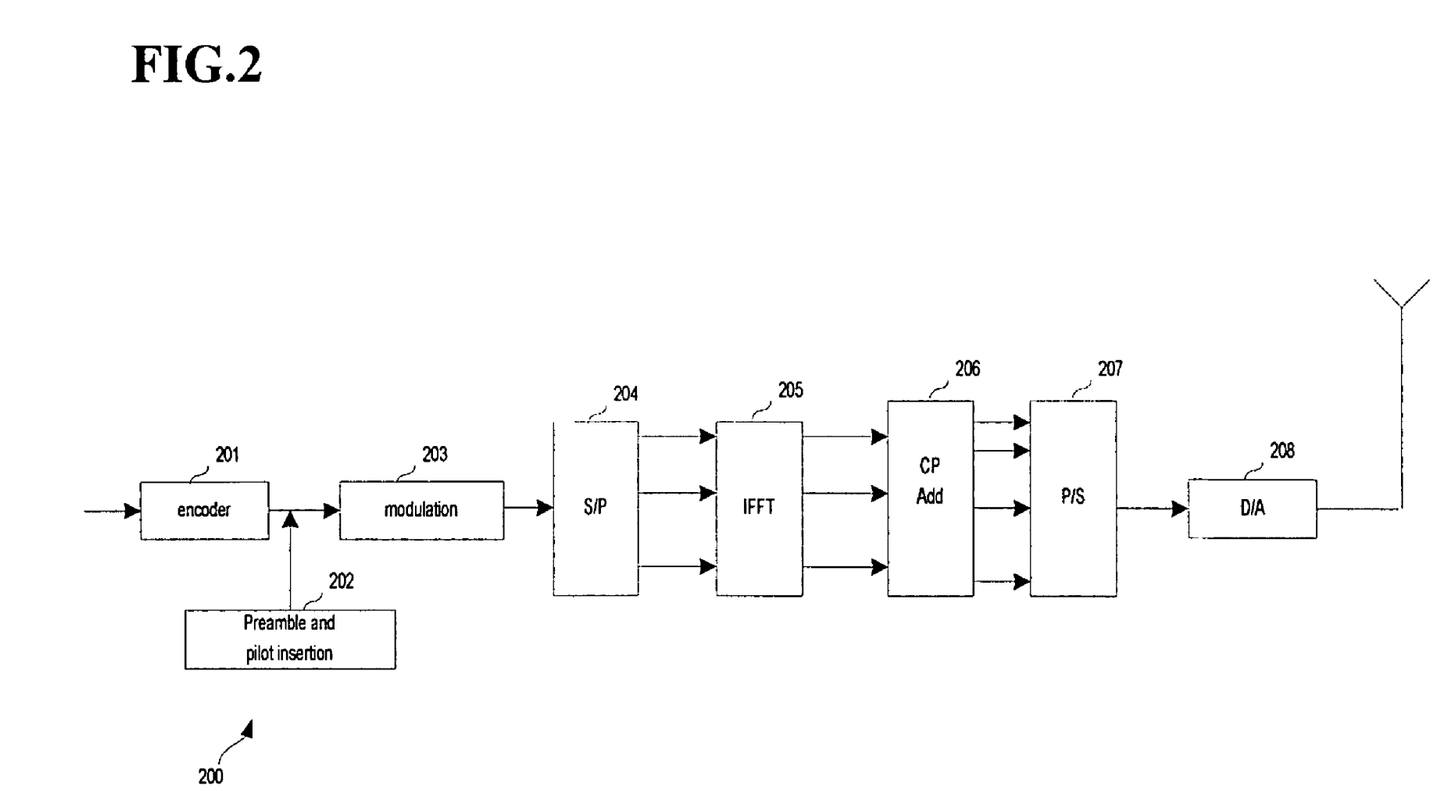
FIG. 2 is a function block diagram of an OFDM transmitter according to the present invention.

FIG. 2 is a function block diagram of an OFDM transmitter according to an embodiment of the present invention.

Referring to FIG. 2, the OFDM transmitter 200 includes an encoder 201, a preamble and pilot insertion unit 202, a modulation unit 203, a serial/parallel (S/P) converter 204, an IFFT unit 205, a CP add unit 206, a parallel/serial (P/S) converter 207, and a digital to analog (D/A) converter 208.

The transmitted bit is encoded by the encoder 201 which includes a convolution coder, a turbo coder, and a low density parity coder (LDPC). For each frame, the first symbol is a preamble which is known by the receiver. In the following symbols, the pilot bits known by the receiver are inserted in accordance with some principles, and the operation is performed by the preamble and pilot insertion unit 202. Then, the transmitted bit is modulated into the symbols by modulation unit 203 which include 64QAM (Quadrative Amplitude Modulation), 16QAM and QPSK (Quadrative Phase Shift Keying). For the IFFT operation, the processed data must be parallel, and the serial/parallel (S/P) converter 204 is used to convert the transmitted symbols from serial symbols into parallel data. After the IFFT unit 205, the CP is inserted in the OFDM symbol by the CP add unit 206 in order to eliminate the inter-symbol-interference (ISI). Then, the P/S unit 207 is applied to convert the parallel symbols into the serial symbols. Before the transmitted signal is transmitted into the wireless channel, the digital signal is changed into an analog signal by D/A converter 208.

Figure 3:
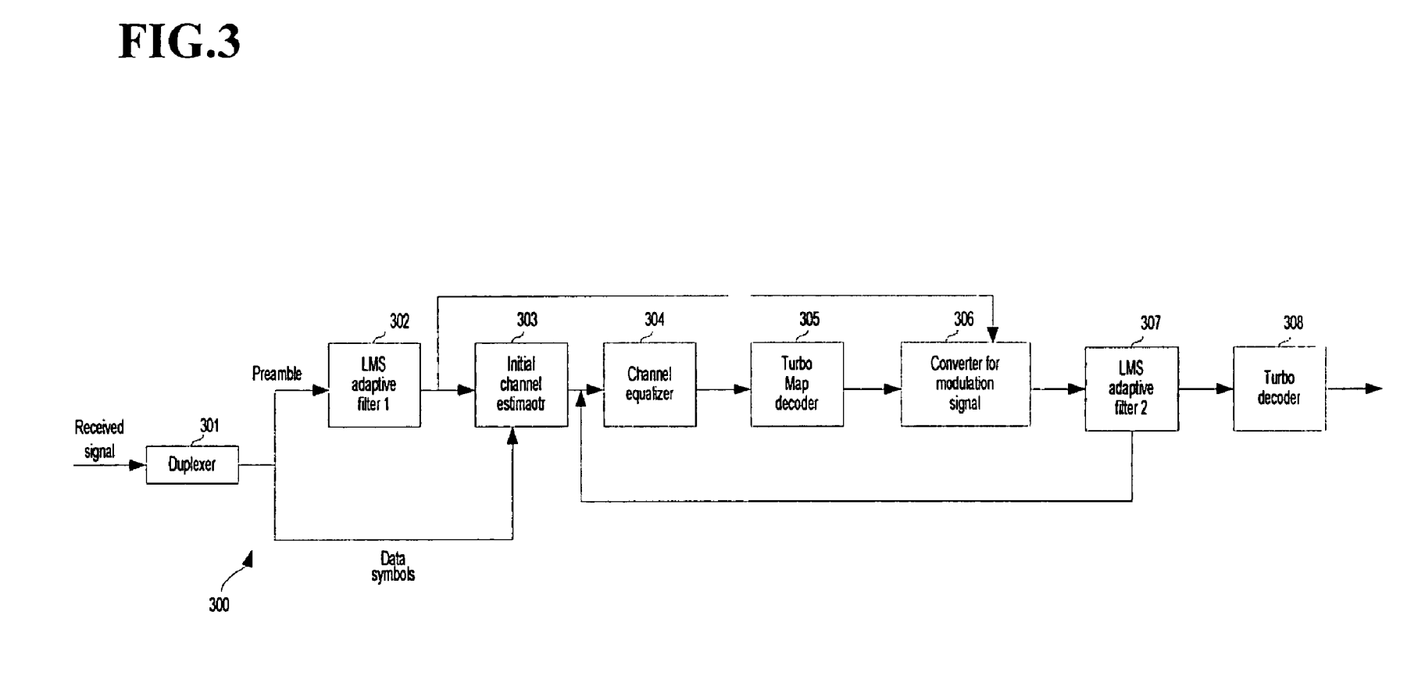
FIG. 3 is a function block diagram of an OFDM receiver according to the present invention.

FIG. 3 is a function block diagram of an OFDM receiver according to an embodiment of the present invention.

Referring to FIG. 3, the receiver 300 includes a duplexer, 301, a first LMS adaptive filter 302, an initial channel estimator 303, a channel equalizer 304, a turbo map decoder 305, a modulation signal converter 306, a second LMS adaptive filter 307, and a turbo decoder 308.

The received signal is divided into a preamble symbol and a data symbol by the duplexer 301. In order to cancel the ICI of the preamble due to phase noise, the preamble symbol is processed by the first LMS adaptive filter 302 so that most of the ICI in the preamble symbol is cancelled. According to the LMS algorithm for the preamble symbol, the initial channel parameters can be attained by the initial channel estimator 303. Hence, the received data can be compensated by the channel equalizer 304. After the channel equalizer, the ICI due to the phase noise cannot be removed. The soft decision value of the turbo code can provide ICI information which can be cancelled by the second LMS adaptive filter 307. The initially equalized data are provided to the turbo MAP decoder 305, and the iteration time of the turbo MAP decoder 305 can be reduced in order not to add any more complex components into the receiver. After the signal is decided by the initial decided signal, then the modulated signal is reconfigured by the modulation signal converter 306. The soft decision value can be provided to the second LMS adaptive filter 307 so that the ICI can be cancelled partially or completely. The decided data are iterative to improve the data accuracy. At last, the ICI-free signal is provided to the turbo decoder 308 to attain data.

Figure 4:
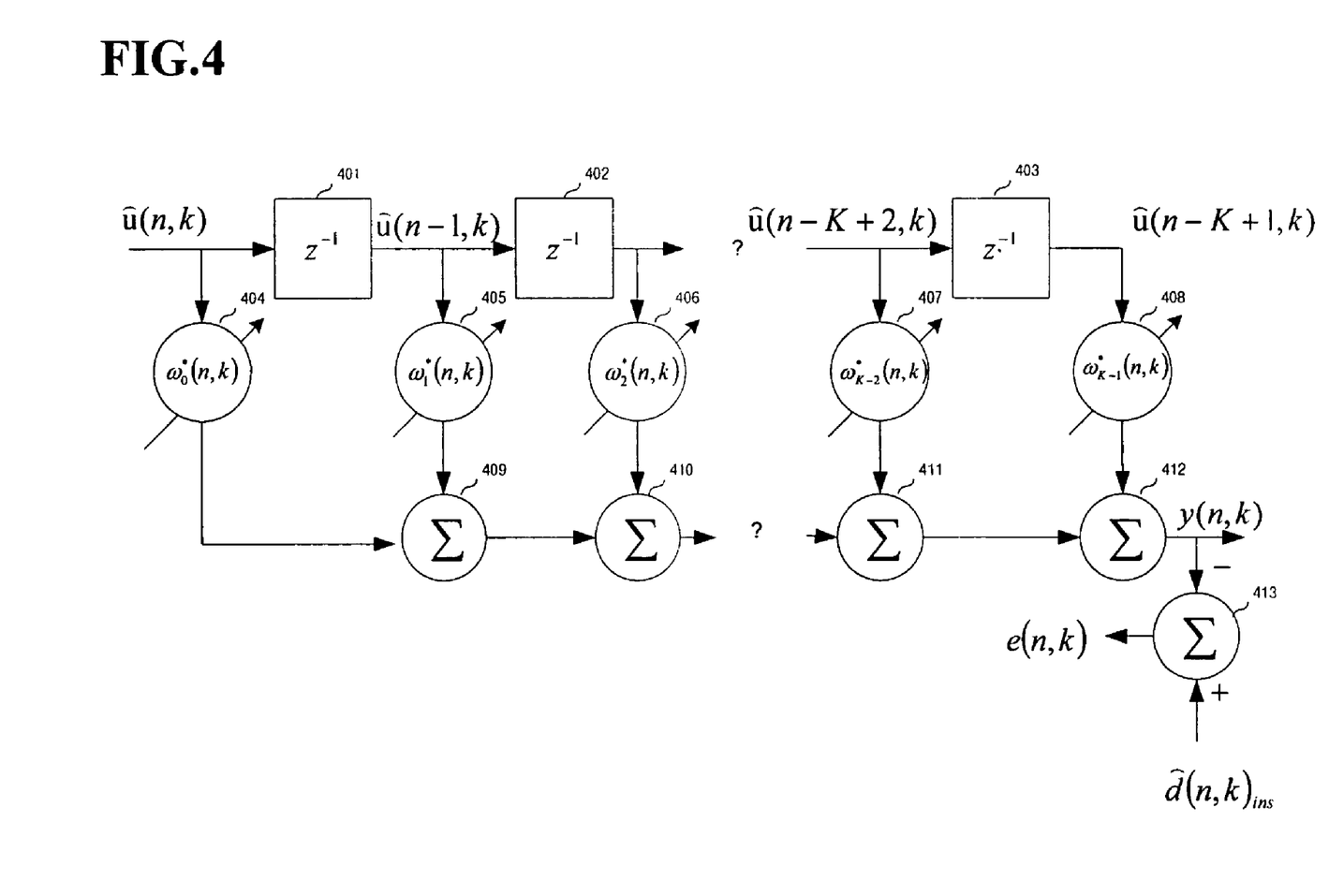
FIG. 4 is a channel equalizer according to the present invention.

FIG. 4 is a channel equalizer according to an embodiment of the present invention.

Referring to FIG. 4, the channel equalizer 304 includes delay units 401, 402, and 403, weight modification units 404, 405, 406, 407, and 408, and summation units 409, 410, 411, 412, and 413.

The received data signal is sequentially input to the delay units 401, 402 and 403, the delayed data signal is multiplexed and summed by the corresponding weight modification units 404, 405, 406, 407, and 408 and the summation units 409, 410, 411, and 412. By the initial decision data signal and the output in Equation (10), the error signal is obtained by the summation unit 413 as expressed in Equation (11). The initial weight is selected in accordance with the preamble symbol.

FIG. 5 is a non-binary turbo-code according to an embodiment of the present invention. It uses a double binary circular recursive systematic convolutional code. The bits of the data to be encoded are alternatively fed to A and B, starting with the most Significant Bit (MSB) of the first byte being fed to A. The encoder is fed by blocks of k bits or N couples (k=2*N bits). The polynomial defining the connections is described in the octal and symbol notations as follows:

For the feedback branch: o×B, equivalently $1+D+D^3$ (in symbolic notation)

For the Y parity bit: 0×D, equivalently $1+D^2+D^3$

For the W parity bit: 0×9, equivalently $1+D^3$

Figure 6:
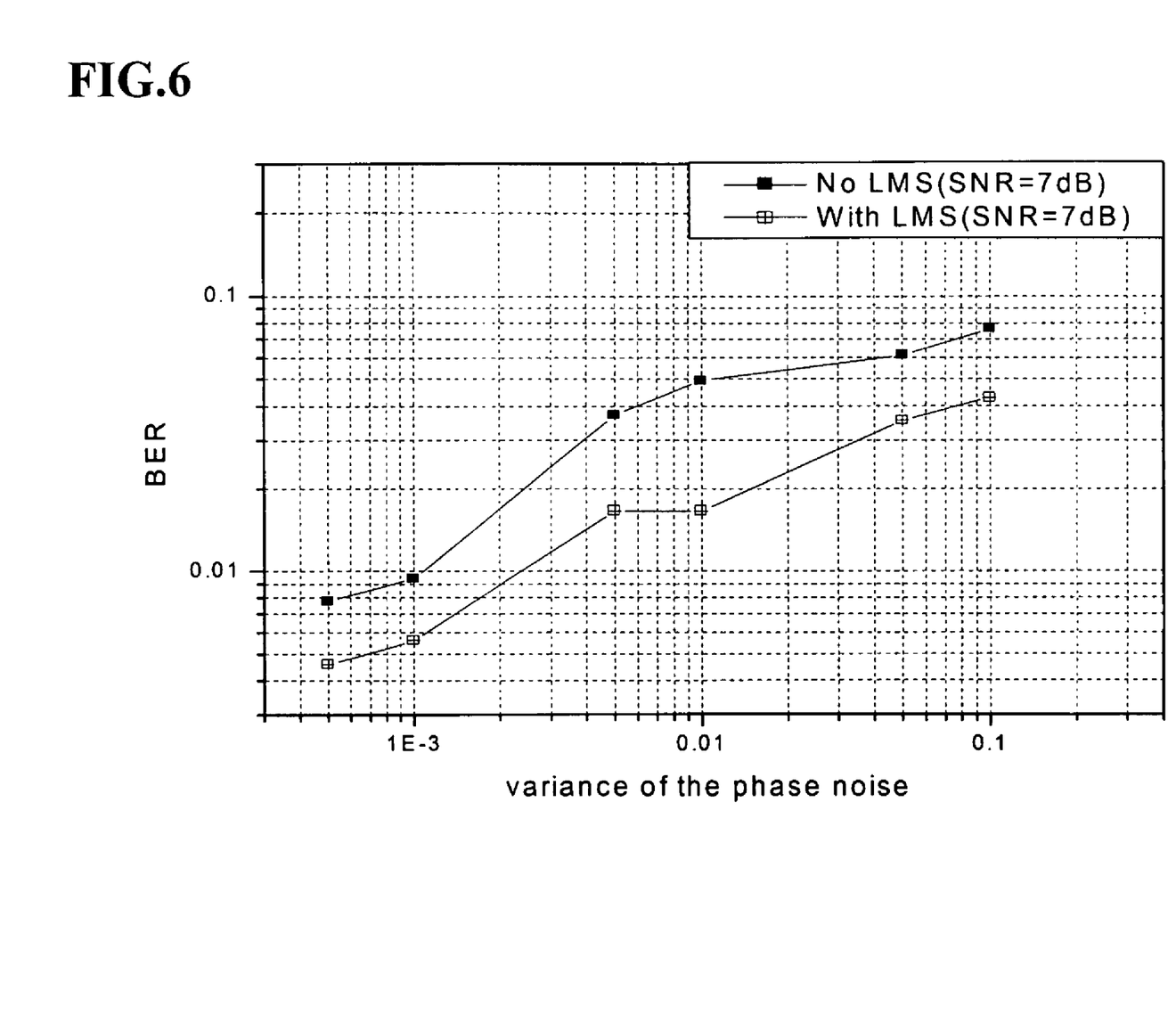
FIG. 6 is the performance comparison of the receiver (SNR=7 dB) according to the present invention.
Figure 7:
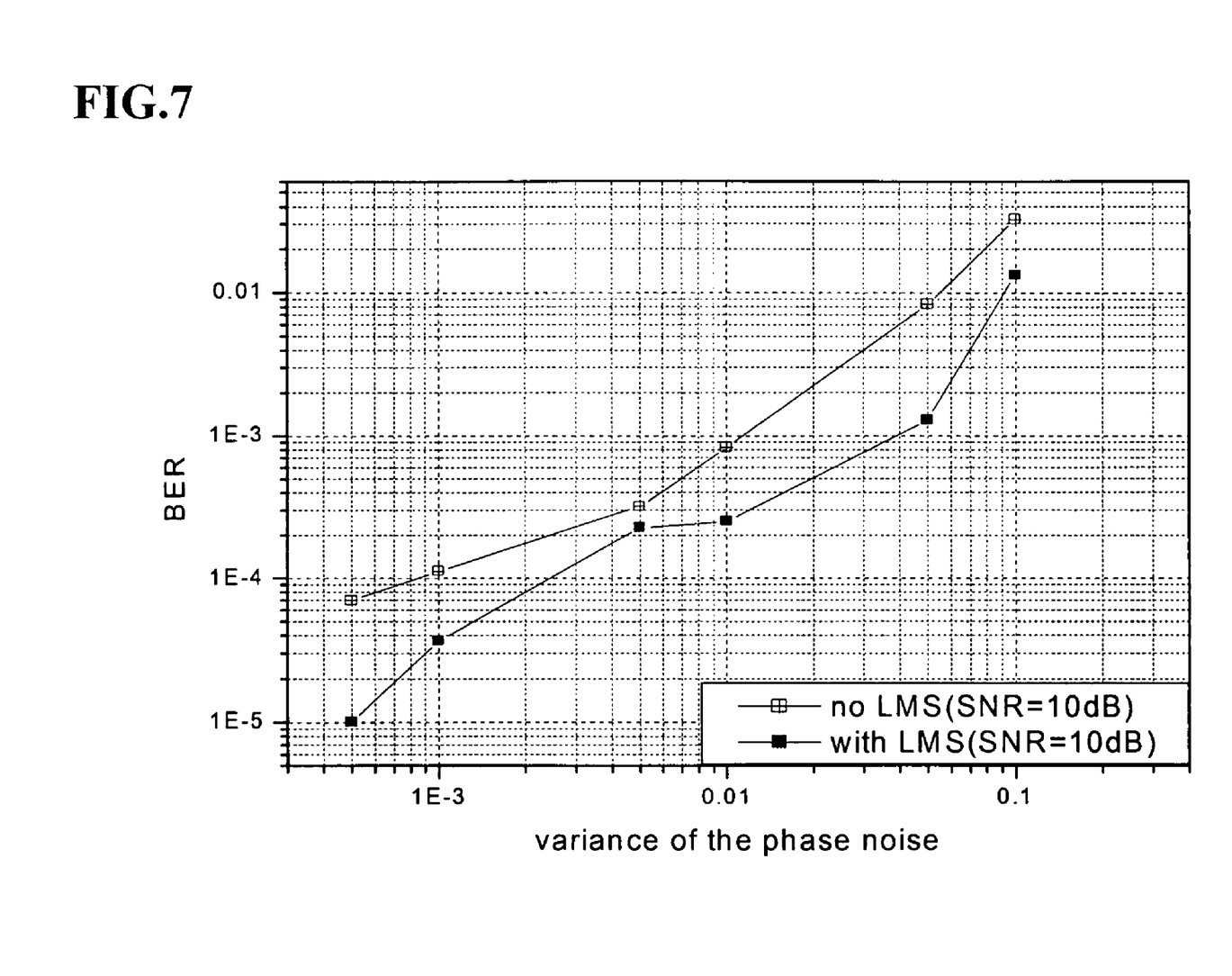
FIG. 7 is the performance comparison of the receiver (SNR=10 dB) according to the present invention.

FIG. 6 and FIG. 7 show the performance comparison of the receiver (SNR=7 dB and SNR=$_{10}$ dB) according to an embodiment of the present invention.

The downlink is built according to the physical layer of WIBro system. The basic parameters are shown in Table 1. The simulation channels include the AWGN Additive White Gaussian Noise and three kinds of radio channels.

TABLE 1

| Item | Value |
| --- | --- |
| Carrier frequency | 2300~2400 MHz |
| Bandwidth | 10 MHz |
| Duplexing method | TDD |
| Access type | OFDM/TDMA |
| Modulation Constellation | QPSK, 16QAM, 64QAM |
| Number of Used sub-carrier | 864 out of 1024 |
| Number of Traffic sub-carriers | 768 |
| Cyclic prefix (CP symbols) | 1/8(128) |
| Sampling frequency | 10 MHz |
| Sub-carrier spacing | 9.76525 KHz |

In order not to increase the number of iteration times in the turbo decoder, the number of iterations is set to 2 so as to acquire the desired value. In the following final decision, the number of iterations is 4. Accordingly, the whole number of iterations is 6 which is the same as that of the conventional receiver. The tap number of the LMS adaptive filter is 8.

These results show that the BER of the embodiment of the present invention is better than that of the other receivers. There are two reasons for this: first, the estimated channel parameter will become more accurate than the conventional receiver by the LMS adaptive filter applied in the preamble symbol; and second, the ICI effect can be reduced the joint channel estimation and the LMS adaptive filter. Because the complexity of the LMS adaptive filter is not great, the complexity of the whole receiver is not substantially increased, and the tradeoff between complexity and performance is found to be good. For the implementation of a Digital Signal Processor (DSP) or a Field Programmable Gate Array (FPGA), the increased complexity is not considered a problem.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for canceling inter-carrier interference (ICI) from an Orthogonal Frequency Division Multiplexing (OFDM) signal received from a receiver in a wireless communication system, the method comprising:

canceling ICI included in a preamble symbol of the received signal;

channel equalizing a data symbol of the received signal by using an initial channel parameter estimated by using the ICI-canceled preamble symbol, and channel equalizing the data symbol of the received signal by using the initial channel parameter;

finding a soft decision value of a turbo code for the channel-equalized data symbol; and canceling the ICI from the data symbol by using the soft decision value, wherein in canceling the ICI included in the preamble symbol, the ICI canceled preamble symbol satisfies the equation:

$$y(k) = \hat{W}^H(k)\hat{u}(k),$$

where k=1, ..., N, the N is the total number of subcarriers, a tap-weight is $\hat{W}(k) = [\omega_0(k), \omega_1(k), \ldots, \omega_{K-1}(k),]^T$, and $\hat{u}(k) = [\hat{u}(k), \hat{u}(k-1), \ldots, u(k-K+1)]^T$, wherein channel equalizing the data symbol of the received signal comprises:

multiplexing the received data estimated by the initial channel parameter by using a weight, by delaying the received data for a predetermined time frame and applying a weight to the received data and the delayed data; and adding the multiplexed received data to output equalized data.

2. The method of claim 1, wherein the channel equalizing step, the soft decision value finding step, and the ICI canceling step from the data symbol are repeated to cancel the ICI from the received signal.

3. The method of claim 1, wherein the tap-weight follows the equation:

$$\hat{W}(k+1) = \hat{W}(k) + \mu\hat{u}(k)e^*(k),$$

where μ is the step-size parameter, and the initial value of $\hat{W}$ is $[1,0,\ldots,0]^T$.

4. The method of claim 1, wherein the initial channel parameter satisfies the equation:

$$\hat{H}(k)_{ini} = Y(k)X(k) + e(k)d(k)$$

where y(k) is the received signal, x(k) is a signal transmitted from the transmitter of the wireless communication system and is given as 1 or −1 for the preamble, and e(k) is the ICI satisfying the equation:

$$e(k) = \hat{d}(k)_{ins} - y(k)$$

where $\hat{d}(k)_{ins}$ is a request response for the ICI canceled preamble symbol, and d(k) is the ICI canceled preamble symbol.

5. The method of claim 4, wherein the received data estimated by the initial channel parameter satisfies the equation:

$$\widetilde{u}(n, k) = \frac{Y(n, k)\widehat{H}(k)_{ini}^*}{\left|\widehat{H}(k)_{ini}^*\right|^2} + e'(k).$$

6. A receiver device for canceling inter-carrier interference (ICI) from an Orthogonal Frequency Division Multiplexing (OFDM) signal received from a receiver in a wireless communication system, the receiver device comprising:

a first Least Mean Square (LMS) adaptive filter for canceling ICI included in a preamble symbol of a received signal by using a LMS adaptive method;

a channel estimator for estimating an initial channel parameter by using the ICI canceled preamble symbol;

a channel equalizer for channel equalizing a data symbol of the received signal by using the initial channel parameter estimated by the channel estimator;

a turbo map decoder for generating a soft decision value of the turbo code for the channel equalized data symbol; and a second LMS adaptive filter for canceling ICI from the data symbol through the LMS adaptive method by using the soft decision value generated by the turbo map decoder, wherein in canceling the ICI included in the preamble symbol, the ICI canceled preamble symbol satisfies the equation:

$$y(k) = \hat{W}^H(k)\hat{u}(k),$$

where k=1, ..., N, the N is the total number of subcarriers, a tap-weight is $\hat{W}(k) = [\omega_0(k), \omega_1(k), \ldots, \omega_{K-1}(k)]^T$, and $\hat{u}(k) = [\hat{u}(k), \hat{u}(k-1), \ldots, u(k-K+1)]^T$, wherein the channel equalizer comprises:

a plurality of delay units for delaying the received data estimated by the initial channel parameter for a predetermined time;

a plurality of weight modification units for applying a predetermined weight to the received data and the data output by the delay units, and multiplexing the weight applied data; and a plurality of summation units for summating the data multiplexed by the weight modification units and generating the summed data as outputs of the channel equalizer.

7. The receiver device of claim 6, wherein the signal output by the second adaptive filter is input to the channel equalizer again and is repeatedly processed by the channel equalizer, the turbo map decoder, and the second adaptive filter.

8. The receiver device of claim 6, wherein the preamble symbol is separated from the received signal to output the preamble symbol to the first LMS adaptive filter, and separating the data symbol from the received signal to output the data symbol is separated to the channel estimator.

9. The receiver device of claim 6, further comprising a turbo decoder for decoding transmission data from the ICI canceled signal output by the second LMS adaptive filter.

* * * * *